United States Patent [19]

Hughes

[11] Patent Number: 4,524,024

[45] Date of Patent: Jun. 18, 1985

[54] PROCESSES OF RECOVERING FATTY ACIDS AND STEROLS FROM TALL OIL PITCH

[75] Inventor: Richard E. Hughes, London, England

[73] Assignee: The Badger Company, Inc., Cambridge, Mass.

[21] Appl. No.: 465,650

[22] Filed: Feb. 10, 1983

[51] Int. Cl.[3] .................................... C09F 1/00

[52] U.S. Cl. .................................... 260/97.6; 260/97.7

[58] Field of Search .................... 260/97.6, 97.7, 107, 260/412, 397.25, 412.5; 203/29, 88

[56] References Cited

U.S. PATENT DOCUMENTS

| | | | |
|---|---|---|---|
| 2,838,481 | 6/1958 | Sullivan | 260/97.6 |
| 2,866,739 | 12/1958 | Ciesielski et al. | 260/97.6 |
| 2,886,492 | 5/1959 | Hanson et al. | 260/97.6 |
| 3,238,164 | 3/1966 | Speck | 260/97.6 |
| 3,654,255 | 4/1972 | Koebner | 260/97.6 |
| 3,709,793 | 1/1973 | Bress | 260/97.6 |
| 3,803,114 | 4/1974 | Mitchell et al. | 260/97.6 |
| 3,943,117 | 3/1976 | Force | 260/97.6 |

*Primary Examiner*—Herbert S. Cockeram
*Attorney, Agent, or Firm*—Schiller & Pandiscio

[57] ABSTRACT

An improved process of enhancing the recovery of fatty acids from tall oil pitch is disclosed. The process includes a hydrolysis step for increasing the free fatty acid available for recovery from tall oil pitch during the distillation process. The hydrolysis step also enables the recovery of sterols where the tall oil pitch is of the type which is rich in sterol esters.

29 Claims, 4 Drawing Figures

PROCESSES OF RECOVERING FATTY ACIDS AND STEROLS FROM TALL OIL PITCH

This invention relates generally to the distillation of tall oil, and more particularly to a method of enhancing the recovery of fatty acids as well as sterols from tall pitch oil.

Crude tall oil is typically formed by a sulphate process employed in the manufacture of cellulose from wood. More particularly, the spent black liquor from the pulping process is concentrated until sodium salts (soaps) of various acids separate out and are skimmed off. The salts are acidified or decomposed with sulfuric acid so as to provide the crude tall oil. This crude tall oil is used to an increasing degree for soap manufacture and lacquer preparation. However, the crude tall oil is a dark colored liquid with an unpleasant smell. It is, therefore, desirable to purify the crude tall oil by separating the oil into its components, whereby a part of the coloring matter and the undesired odorous substances are removed.

Attempts, usually in the form of distillation processes, have long been made to separate crude tall oil into its components and to obtain pure fatty acids and pure resin acids. Examples of distillation techniques of processing crude tall oil into its various components are described in U.S. Pat. Nos. 2,143,345; 2,487,000; 2,591,885; 2,716,630; 2,866,739; and 2,886,492.

A particular distillation process of recovering fatty acids from crude tall oil is a continuous fractional distillation process. As well known, in continuous fractional distillation, a feed to be separated (such as crude tall oil) is added continuously at some position in the fractionating column, a stripping vapor is introduced at or near the bottom of the column and reflux is introduced at or near the top. The stripping vapor introduced in the bottom of the column is usually produced by vaporizing a portion of the liquid taken from the column, the remainder of the liquid in the column being part of the bottoms product. By such a process, it is possible to obtain an overhead product that contains a high concentration of the more volatile components in the feed and a bottoms product that contains a high concentration of the less volatile components. The feed can be liquid or vapor or a mixture of the two.

In recent years the quality of available crude tall oil has on average been poorer than crude tall oil that has been previously available. This is best understood when one considers the well known fact that most crude tall oil exhibits a higher saponification number than acid number because of the presence of neutral but saponifiable esterified fatty acids formed by the esterification of fatty acids with alcohols. In many instances the lower quality crude tall oil contains a significant quantity of non-volatile esterified fatty acids and free fatty acids which become components of the low value tall oil pitch produced in the refining process. The amount and specific composition of these fatty acids will vary both with the source of the crude tall oil, as well as the techniques used for recovering and refining.

The following Table I is based on analyses recorded by B. Holmbom of the Finnish Institute of Wood Chemistry and Cellulose Technology on samples from six different hardwood sources of tall oil pitch. This table shows that a significant quantity of crude tall oil fatty acid in ester form is commonly present in tall oil pitch as indicated by the saponification numbers listed.

The acid numbers listed also indicate the presence of potentially recoverable free acids. For if the amount of non-volatile materials is reduced a similar concentration but reduced amount of free acids will remain in the pitch with the reduced amount of non-volatile materials.

TABLE I

PROPERTIES OF TALL OIL PITCH

| | Finnish | | | | American | |
|---|---|---|---|---|---|---|
| DESCRIPTION | A | B | C | D | E | F |
| Yield % of Crude Tall Oil | 25 | 25 | 25 | 30 | 20 | 20 |
| Acid number mg KOH/gm | 34 | 49 | 38 | 39 | 30 | 27 |
| Saponification number mg KOH/gm | 94 | 115 | 111 | 105 | 106 | 101 |

It is an object of the present invention to provide an improved process of enhancing the recovery of esterified and free fatty acids from tall oil pitch.

Another object of the present invention is to provide an improved distillation process step of enhancing the recovery of both esterified and free fatty acids from tall oil pitch while the crude tall oil is being processed.

And another object of the present invention is to provide an improved distillation process step of enhancing the recovery of both esterified and free fatty acids from tall oil pitch previously obtained from a conventional distillation process of crude tall oil.

These and other objects are achieved by an improved process of enhancing the recovery of fatty acids from tall oil pitch which includes a hydrolysis step for increasing the free fatty acid available for recovery from the tall oil pitch.

One result of the foregoing improved process is that it facilitates the recovery of sterols (i.e., certain high molecular weight alcoholic substances) from the hydrolyzed tall oil pitch derived from the process. More particularly, as described in U.S. Pat. No. 3,691,211, issued to Donald Julian (hereinafter referred to the Julian patent) tall oil pitch typically contains up to 15 percent sterol esters. The Julian patent discloses a four step technique of (A) first dissolving the acid rich pitch (derived from any sterol source) in a solvent mixture consisting of alcohol and hydrocarbon, adding the proper amount of water, and allowing the hydrocarbon phase (which contains the sterol esters) to separate from the water-alcohol phase (which contains the acids). (B) The second step includes saponifying the sterol esters obtained from the hydrocarbon phase of step (A) with a base under conditions described in the patent. (C) The sterols are then recovered, and (D) dissolved in a solvent, whereupon the sterols are recovered and leached with methanol or nitromethane at a temperature within a critical range, also described in the patent.

Accordingly, another object of the present invention is to facilitate the recovery of sterols from tall oil pitch.

The foregoing object as well as other objects are achieved by a process of hydrolyzing a sterol ester rich tall oil pitch in accordance with the present invention so that an appreciable quantity of sterols are present in the acid denuded pitch produced after acid recovery as described herein. The sterols are recovered from this acid denuded pitch by a suitable solvent extraction technique similar to the type described as step (D) in the Julian patent, and as described in greater detail hereinafter.

Other objects of the invention will in part be obvious and will in part appear hereinafter. The invention accordingly comprises the several steps, and the relation of one or more of such steps with respect to each of the others, which are exemplified in the following detailed disclosure.

For a fuller understanding of the nature and objects of the present invention, reference should be made to the following description taken in connection with the accompanying drawings wherein:

DETAILED DESCRIPTION OF THE DRAWINGS

Figure 1:
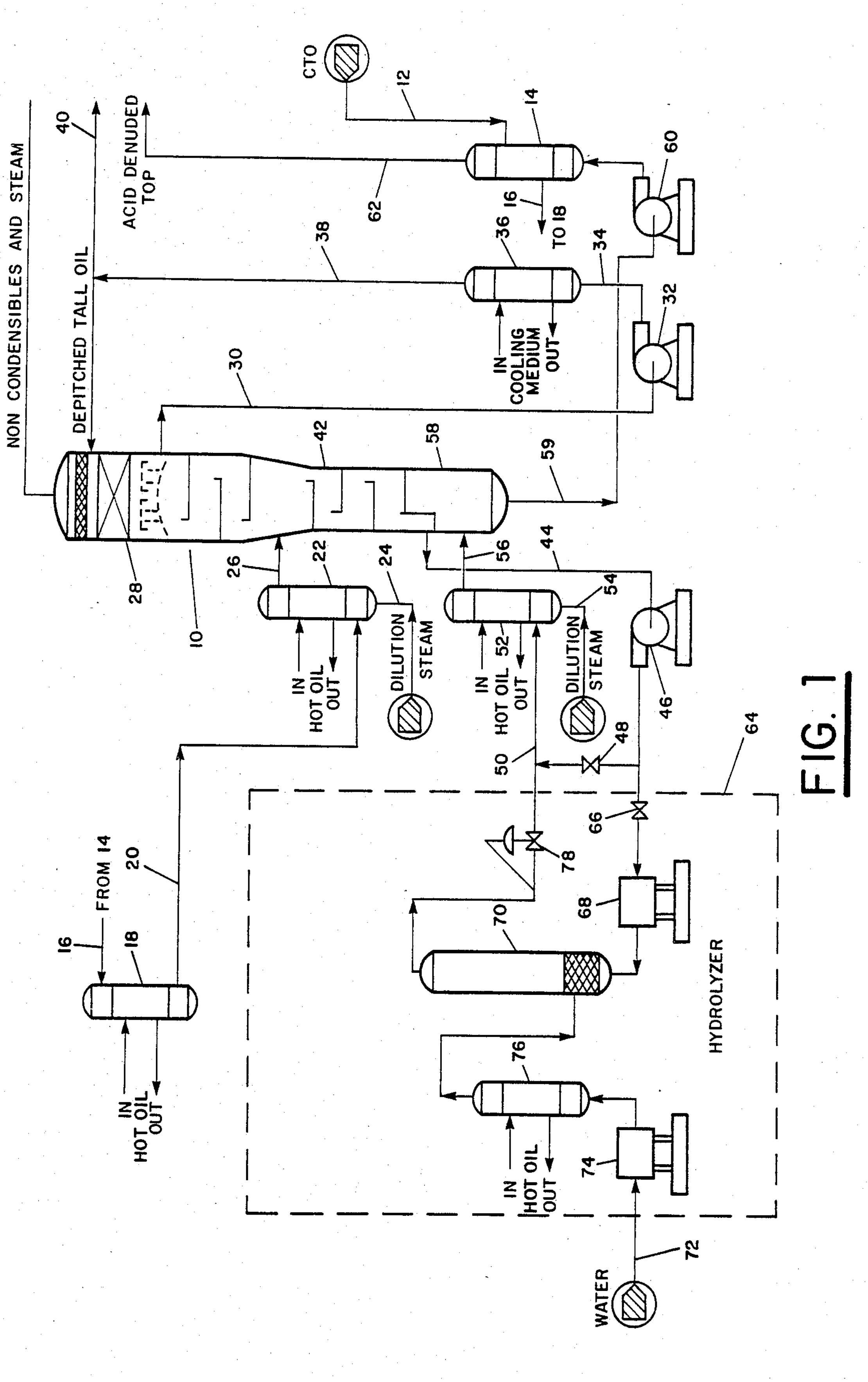
FIG. 1 is a flow sheet diagram of a continuous fractional distillation system for carrying out the preferred embodiment of the crude tall oil treatment process of the present invention.

Referring to FIG. 1, the preferred embodiment of the process of enhancing the recovery of fatty acids while distilling crude tall oil includes continuously treating crude tall oil in a fractionating column or distillation tower 10 so as to form and recover (1) a first fraction including depitched tall oil rich in fatty acids; (2) a second fraction comprising acid denuded tall oil pitch; and (3) a third fraction comprising pitch, free fatty acids and esterified fatty acids. The tall oil source of this embodiment of the distillation process, i.e., crude tall oil, is first fed from a supply line 12 through a pitch cooler unit 14. As will be more evident hereinafter, unit 14 is connected so that the crude tall oil fed from line 12 is heated by the second fraction comprising acid denuded tall oil pitch derived from tower 10 via line 59. In this regard a typical temperature range of the incoming crude tall oil in line 12 is between 60° C. and 100° C., while the typical temperature range of the second fraction material in line 59 is between 260° C. and 285° C. The crude tall oil in line 12 thus extracts heat from the acid denuded tall oil pitch product before being fed via line 16 through a feed preheater 18. The latter is a heat exchanger which further heats the crude tall oil to a suitable temperature, typically between 260° C. and 285° C., by heat exchange with an external heat source, such as hot oil. The crude tall oil is then transmitted from the feed preheater 18 via a line 20 to a feed vaporizer unit 22 where it is partially vaporized in the presence of superheated steam, introduced via a line 24, by heat exchange with an external heat source, e.g., hot oil. A typical temperature at which partial vaporization takes place is between 260° C. and 280° C. Feed vaporizer unit 22 is a heat exchanger. The exact operating vaporizing temperature is controlled by the external heat source and the superheated steam injected from line 24 into vaporizer unit 22.

The output of unit 22 is fed via line 26 into distillation tower 10 as a two-phase crude tall oil mixture of liquid and vapor. The mixture forms the feed of the FIG. 1 embodiment of the continuous fractionating distillation process of the present invention.

The vapor phase of the crude tall oil feed mixture rises in tower 10 where at a temperature in the typical range of between 250° C. and 275° C., it is quenched in the upper packed section 28 of tower 10 by a liquid stream derived from the aforesaid first fraction. That first fraction, at a temperature typically in the range of 110° C. and 150° C., is withdrawn from the bottom of section 28 of tower 10 via a line 30 by overhead pump 32. The overhead pump 32 pumps the first fraction through pipe 34 to an overhead cooler 36, where an external cooling source, such as cooling water, further cools the fraction. The fraction leaves cooler 36 at a lower temperature, typically in the range of 60° C. and 100° C. and in a liquid form, via line 38 which circulates it back into the upper end of quenching section 28. The remainder of that first liquid fraction is withdrawn via line 40 as the depitched tall oil product. As well known this product can, for example, be refined to produce discrete resin acid and fatty acid products.

The liquid phase of the feed from line 26 descends through a trayed stripping section 42 positioned below the entry point for the feed into the tower 10. As the liquid descends through section 42, the remaining volatile constituents are largely stripped from the non-volatile pitch which is recovered via line 59.

In order to provide continuous fractional distillation, it is necessary to introduce a stripping vapor into tower 10 counter-current to the flow of the liquid phase of the feed. The foregoing is achieved by drawing the third mentioned fraction from the stripping section 42. This fraction, which comprises pitch, free fatty acids, as well as esterified fatty acids, is withdrawn via line 44 and pump 46. In accordance with prior art techniques, the third fraction would be pumped through an open valve 48 into a line 50 which feeds it into a reboiler 52. The latter generates the stripping vapor in the presence of superheated steam by partially flash vaporizing the liquid pumped into it. The temperature of the material leaving reboiler 52 is typically in the range of 265° C. and 285° C. The partially vaporized material from the reboiler 52 is discharged through line 56 directly into the bottom section 58 of tower 10 below stripping section 42. The liquid portion of the stream from reboiler 52 gravitationally settles and forms the second fraction comprising the acid denuded tall oil pitch which is withdrawn by line 59. This second fraction is pumped by pitch pump 60 through cooler unit 14 over line 62 to a suitable storage facility.

To the extent described above, the process is known. In accordance with the present invention, an additional step is provided for enhancing the recovery of fatty acids from the tall oil pitch passing through stripping and bottoms sections 42 and 58 of tower 10.

In the FIG. 1 embodiment of the process of the present invention the output of pump 46 is hydrolized before being fed into the reboiler 52. More particularly, the valve 48 is closed or eliminated and the output of pump 46 is fed into a hydrolyzer reactor stage 64 which includes a normally open valve 66 and a pump 68. The latter is a high pressure hydrolysis stage feed pump for boosting the discharge pressure of the material provided by pump 46 prior to hydrolyzing the fractional material in a hydrolyzer reactor 70. Water is simultaneously fed from a water line 72 by another hydrolysis stage feed pump 74 through a water pre-heater 76 into the hydrolyzer reactor 70. Preheater 76 is a suitable heat exchanger which transmits heat from a hot fluid, e.g. hot oil, to the water feed from line 72. The water has a temperature of about 260° C. as it passes into reactor 70. The exact operating conditions will vary with feed composition. Preferably the hydrolyzer stage is operated so that (a) the feed material is fed to reactor 70 at a temperature of 265° C. to 280° C.; (b) the feed material is fed by pump 68 at a pressure of 40 Kg/Cm$^2$ to 70 Kg/Cm$^2$; and (c) the residence time of the feed material in the reactor is between about 15 and 50 minutes.

During the hydrolysis step, additional free fatty acids are derived by hydrolytic splitting of the fatty acids esters present in the pitch fraction. The aqueous hydrolysis reaction product is then fed from reactor 70 through a suitable back pressure controlled valve 78, via a line 50 into reboiler 52, where the mixture is heated by an external heat source so as to complete the vaporization of the desirable volatile fatty acids to be recovered. The hydrolyzed mixture is then admitted directly into the bottom section 58 of tower 10, as previously described. The fatty acid denuded pitch fraction gravitationally separates as before and is pumped into storage after being cooled by cooler 14. The fatty acid enriched vapor phase becomes the distillation tower stripping vapor and rises counter-currently to the flow of liquid descending from the feed 26. This stripping vapor contains steam derived from excess hydrolysis water and may be augmented by additional superheated steam supplied by line 54 if required to limit the vaporization temperature in reboiler 52. The steam exits through the top of the tower 10, with other incondensables.

The following is an example of the process described with reference to FIG. 1, it being understood that the example is for purposes of illustration and not limitation.

EXAMPLE 1

Crude tall oil is introduced by line 12 at a typical storage temperature, e.g., 70° C., at a rate of about 10,000 Kg/hr and passes through cooler 14 where it is partially heated by the pitch fraction extracted from the bottom section of tower 10. The crude tall oil, now at a temperature of about 120° C., is fed over line 16 through feed preheater 18 where it is heated to a temperature of about 265° C. The hot crude tall oil is delivered by line 20 to the feed vaporizer 22 where, after the addition of dilution steam from line 24, the crude tall oil is partially vaporized so that it exits line 26 as a two-phase (liquid and vapor) mixture at a typical temperature of 270° C. The two-phase mixture including dilution steam thus is introduced into tower 10 at a flow rate of about 11,000 Kg/hr at a temperature of approximately 270° C. The first fraction, comprising the depitched tall oil rich in fatty acids, is in liquid form at an approximate temperature of 120° C. when it is removed from the bottom of quenching section 28 of tower 10. This quenched first fraction is pumped through line 30, pump 32 and line 34 into the overhead cooler 36. The first fraction exits the cooler at a temperature of approximately 80° C. About 70% of the first fraction is recycled back into distillation tower 10, and the remainder is delivered via line 40 to product storage.

An acid denuded tall oil pitch fraction is delivered via line 59 and pump 60 from the bottom section 58 of tower 10, at a temperature of about 275° C., to pitch cooler 14. The fraction exits cooler 14 at a temperature of about 110° C., and is delivered to a pitch storage facility. The third fraction is removed by line 44 and pump 46 from the stripping section 42 of tower 10 at a pressure of about 80 mm Hg Abs. The third fraction exits pump 68 and enters the hydrolyzer reactor 70 at a higher pressure of about 50 Kg/Cm$^2$. Water from line 72 is pumped by the hydrolysis water feed pump 74 into preheater 76 where it is heated to a temperature of about 260° C. before entering reactor 70. The water is fed at a rate of 800 Kg/hr into reactor 70. The mixture remains in the reactor 70 for about 30 minutes at a pressure of about 50 Kg/Cm$^2$. The aqueous hydrolyzed mixture exits the hydrolyzer reactor 70 at a temperature of about 260° C. and passes via the back pressure control valve 78 and line 50 into externally heated reboiler 52 at an approximate pressure of 300 mm Hg Abs. Superheated steam introduced via line 54 at a temperature of 280° C. and a rate of about 600 Kg/hr, is used to control the temperature and concentration of the hydrolyzed mixture so as to limit the vaporization temperature of the mixture in the reboiler to about 275° C. The mixture enters the bottom section 58 of tower 10 at a temperature of about 275° C. and pressure of approximately 85 mm Hg Abs. The fatty acid denuded pitch constituent of the mixture gravitationally separates as previously described and is pumped into storage after cooling. The fatty acid enriched vapor phase constituent of the mixture becomes stripping vapor in the tower 10.

A similar run under substantially the same conditions can be made in which valve 66 is closed and valve 48 is open, whereby the distillation process can be performed in accordance with prior art techniques without the hydrolysis step so that a comparison can be made as to the amount of fatty acid recovery. Typical comparative results of such runs are provided in the following Table II.

TABLE II

MATERIAL BALANCE AND YIELD SUMMARY

| STREAM | CTO FEED (1) | WITHOUT TOP HYDROLYSIS DPTO | WITHOUT TOP HYDROLYSIS TOP | WITH TOP HYDROLYSIS DPTO | WITH TOP HYDROLYSIS TOP | ACID INCREMENT IN DPTO (4) |
|---|---|---|---|---|---|---|
| COMPOSITION WT % | | | | | | |
| Rosin Acids | 39 | 49.5 | 14.5 | 45.4 | 14.5 | 15.0 |
| Fatty Acids | 36 | 48.1 | 7.8 | 52.2 | 7.8 | 85.0 |
| Others (2) | 25 | 2.4 | 77.7 | 2.4 | 77.7 | |
| FLOW RATE Kg/Hr | 10,000 | 6,950 | 3,000 | 7,875 | 2,075 | 903 |
| YIELD PERCENT (3) | 100 | 69.5 | 30 | 78.75 | 20.75 | 13 (5) |
| CHARACTERISTICS | | | | | | |
| Acid No. | 144 | 187 | 42 | 188 | 42 | |

TABLE II-continued

| | MATERIAL BALANCE AND YIELD SUMMARY | | | | | |
|---|---|---|---|---|---|---|
| | CTO | WITHOUT TOP HYDROLYSIS | | WITH TOP HYDROLYSIS | | ACID INCREMENT |
| STREAM | FEED (1) | DPTO | TOP | DPTO | TOP | IN DPTO (4) |
| Saponification No. | 161 | | 100 | | 59 | |

Notes
(1) Dry Basis
(2) "Others" include unsaponifiables, esters and other non-volatile components
(3) Overall yields within TOP (tall oil pitch) hydrolysis are based on 99.5% feed recovery. Loss of 0.5% is largely volatile material removed with the non-condensibles and steam to the vacuum system. A small extra loss with the TOP hydrolysis step included is condensated by the addition of hydrolysis water.
(4) The Acid Increment recovered in the DPTO (depitched tall oil) with TOP hydrolysis consists of 80 percent of fatty acids recoverable by hydrolysis plus resin acids and fatty acids recovered due to the overall reduction in TOP yield at a constant acid concentration.
(5) The acid increment yield is defined as the percent increase in DPTO acid content with TOP Hydrolysis.

As shown in Table II, the amount of fatty acids in the depitched tall oil as a composition weight percentage was 48.1% without the hydrolysis step, but increased to 52.2% with the hydrolysis step. Additionally, for a flow rate input of 10,000 Kg/hr the flow rate output of the depitched tall oil increased from 6,950 Kg/hr to 7,875 Kg/hr when the hydrolysis step is employed. Finally, based upon a 99.5% recovery (wherein 0.5% is largely volatile material removed with the non-condensibles and steam to the vacuum system) the yield percentage of the depitched tall oil increased from 69.5% to 78.75%.

It should be evident that the FIG. 1 embodiment can be modified without departing from the scope of the invention. For example, a separate vaporizer and knock-out drum can be connected to the output of back pressure control valve 78 so as to allow the post hydrolysis vaporization and liquid-vapor separation steps to be performed outside of the distillation tower 10. The steam laden fatty acid provided from the knock-out drum will augment rather than supplant normal stripping vapor generated in the reboiler 52. The acid denuded pitch product will then be obtained as a liquid stream from the knock-out drum.

Figure 2:
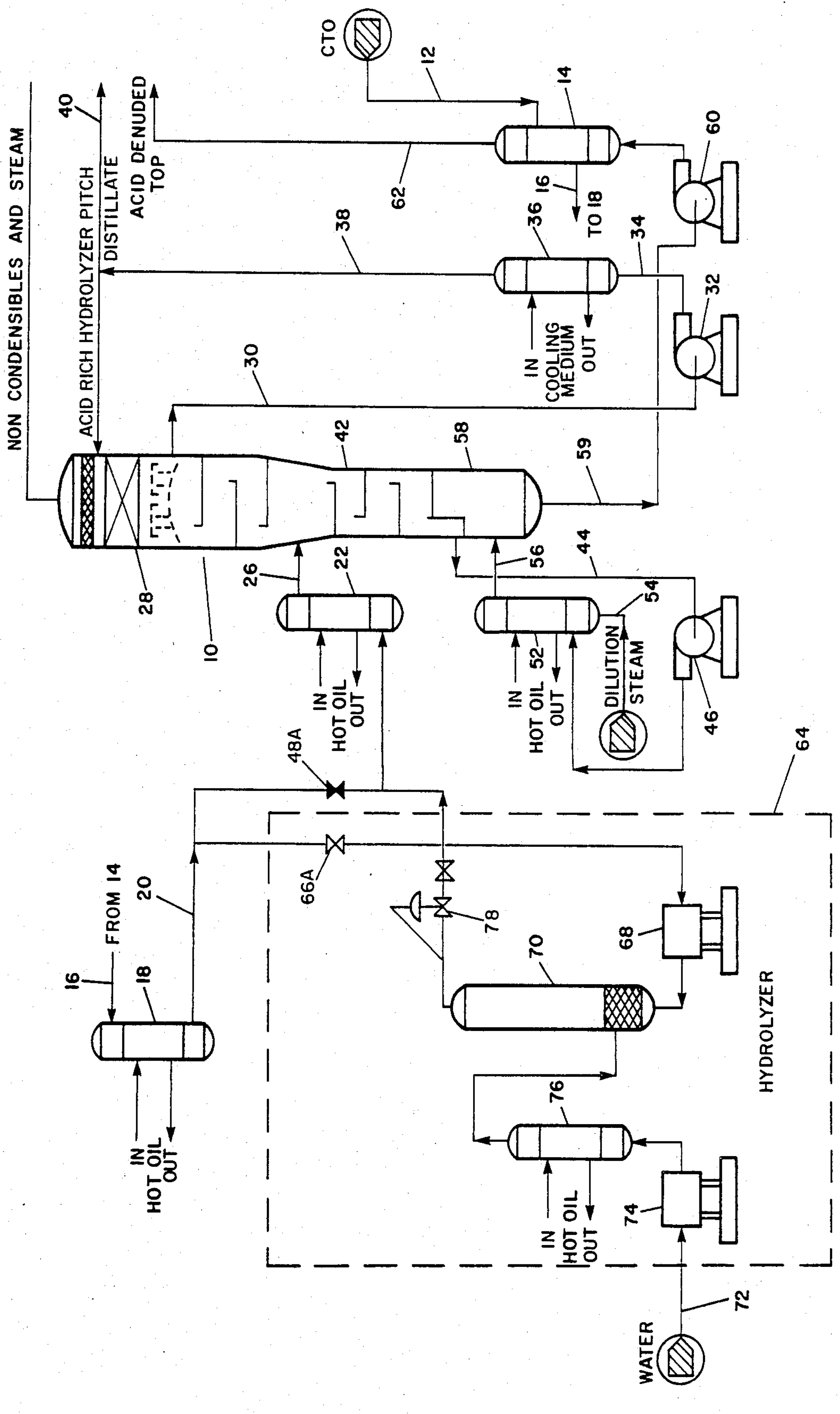
FIG. 2 is a flow sheet diagram of a continuous fractional distillation system for carrying out the preferred embodiment of the tall oil pitch treatment process of the present invention.

As shown in FIG. 2, as an additional alternative, tall oil pitch can be accumulated during a typical crude tall oil run, without the hydrolysis step, and then hydrolyzed and distilled in the crude oil distillation tower 10 on an intermittent basis. More particularly, crude tall oil is heated by pitch cooler 14 by acid denuded top oil pitch drawn from the bottom section 58 of tower 10. The heated crude tall oil is further heated in feed preheater 18 and then transmitted through an open valve 48A and line 20A into the feed vaporization unit 22 where it is vaporized after dilution with steam from line 24 as previously described so as to form the two phase mixture at a predetermined controlled temperature. During this operation a valve 66A leading to hydrolyzer unit 64A is closed. The heated two-phase mixture is introduced into the trayed stripping section 42 of tower 10 where the vapor of the mixture rises and is rapidly quenched in the upper packed section 28 of tower 10 by the liquid stream circulated by overhead pump 32. The liquid phase of the feed from line 26 descends through the stripping section 42 of tower 10 where its remaining volatile constituents are largely stripped from the non-volatile pitch. The second fraction is pumped by the reboiler feed pump 46 directly into the reboiler 52. The latter partially vaporizes the liquid received from pump 46 and generates the stripping vapor in the presence of superheated dilution steam from line 54. The partially vaporized material from reboiler 52 discharges directly into the bottom section 58 of tower 10. The liquid portion gravitationally settles and is pumped by pitch pump 60 through pitch cooler 14 into storage.

To the extent described, the process associated with FIG. 2 is old. In accordance with the present invention the acid denuded tall oil pitch fraction accumulated in storage functions as the source of this embodiment of the invention and is reprocessed to enhance the overall recovery of fatty acids.

For that purpose, the valve 48A is closed and valve 66A is opened. The acid denuded tall oil pitch is fed from storage through pitch cooler 14 over line 16 to feed preheater 18. The output pitch, at a temperature within the approximate range of 260° C. and 280° C. is fed over line 20 through open valve 66A into the hydrolyzer unit 64A. The high pressure feed pump 68 boosts the pressure to a value within the range of 40 $Kg/Cm^2$ and 70 $Kg/Cm^2$ so that the pitch can be fed into the hydrolyzer reactor 70 at the higher pressure. In the same manner, as previously described with respect to FIG. 1, water is simultaneously fed from line 72 by hydrolysis water feed pump 74, through water preheater 76 into the hydrolyzer reactor 70. The operating conditions will vary as a function of feed conditions. Again typical conditions are the same as those described with reference to FIG. 1. The aqueous hydrolyzed mixture is fed into feed vaporizer 22 through back pressure control valve 78 set at a selected level as previously described. The vaporizer 22 uses external heat to complete the flash vaporization of the desirable volatile fatty acids to be recovered. (Note the dilution steam provided over line 24 is not required). The hydrolyzed mixture is then admitted into the distillation tower 10 in place of the normal crude tall oil feed. The process then proceeds as previously described with the acid rich tall oil pitch distillate being produced overhead and the bottom acid denuded tall oil pitch produced in the bottom section 58 in the manner as previously described.

The following is an example of the process described with reference to FIG. 2, it being understood once again that the example is for purposes of illustration and not limitation.

EXAMPLE 2

Initially, valve 66A is closed and valve 48A is opened so that crude tall oil can be continuously distilled in accordance with the prior art. When a sufficient amount of tall oil pitch has been stored it can be rerun through the system of FIG. 2. Specifically, valve 48A is closed and valve 66A is open so that the hydrolysis step can be used in accordance with the the teachings of the present invention. Once the valve 48A is closed and valve 66A is open the tall oil pitch is introduced from storage by line 12 at a typical storage temperature, e.g., 100° C., at a rate of 10,000 Kg/hr and passed through cooler 14 where it is partially heated by the pitch fraction extracted from the bottom section of tower 10. The tall oil pitch, now at a temperature of about 215° C., is fed over line 16 through preheater 18 where it is heated to a temperature of about 265° C. The hot tall oil pitch is delivered by line 20 through valve 66A to the pump 68 of the hydrolyzer reactor stage 64A at a pressure of about 2 $Kg/Cm^2$. The pitch exits pump 68 and enters the hydrolyzer reactor 70 at a higher pressure of about 50 $Kg/Cm^2$. Water from line 72 is pumped by the hydrolysis water feed pump 74 into preheater 76 where it is heated to a temperature of about 260° C. before entering reactor 70. The water is fed at a rate of about 1200 Kg/hr into reactor 70. The mixture remains in the reactor 70 for about 30 minutes at a pressure of about 50 $Kg/Cm^2$. The aqueous hydrolyzed mixture exits the hydrolyzer reactor 70 at a temperature of about 260° C. and passes via the back pressure control valve 78 and line 20A into the externally heated feed vaporizer 22 from where it exits via line 26 as a two-phase (liquid and vapor) mixture at a typical temperature of 250° C. The two-phase mixture thus is introduced into tower 10 at a flow rate of about 11,200 Kg/hr at a temperature of approximately 250° C. The first fraction, comprising the depitched tall oil rich in fatty acids, is in vapor form at an approximate temperature of 110° C. when it is removed from the bottom of the quenching section 28 of tower 10. The quenched first fraction is pumped through line 30, pump 32 and line 34 into the overhead cooler 36. The first fraction exits the cooler at a temperature of approximately 80° C. About 70% of the first fraction is recycled back into distillation tower 10, and the remainder is delivered via line 40 to product storage.

As in the previous embodiment of FIG. 1 an acid denuded tall oil pitch is delivered via line 62 and pump 60 from the bottom section 58 of tower 10 through cooler 14 at a temperature of about 130° C., and is delivered to a pitch storage facility.

The third fraction is removed by line 44 and pump 46 from the stripping section 42 of the tower 10 at a pressure of about 80 mm Hg Abs. The third fraction, however, is fed directly from pump 46 into the externally heated reboiler 52. Superheated steam introduced via line 54 at a temperature of 280° C. and a rate of 250 Kg/hr, is used to control the vaporization of the mixture at a temperature of about 275° C. The vaporized mixture enters the bottom section 58 of tower 10 at a temperature of about 275° C. and pressure of approximately 85 mm Hg Abs. The vapor phase introduced over line 56 from the reboiler 52 becomes the stripping vapor in the tower 10.

The foregoing process provides enhanced recovery of fatty acids from the tall oil pitch. The process provides hydrolytic splitting of the fatty acid esters present in the pitch fraction. It is well known that an appreciable portion of the fatty acid esters present in the crude tall oil can be sterolic in composition. See, for example, *The Encyclopedia of Chemical Technology*, 1st Edition, Vol. 13, page 572 which states "the saponification number is always higher than acid number partly due to esters of fatty acids with sterols and other higher alcohols (about half the sterols are esterified)". While the sterol and sterol ester content of the crude tall oil is in part a function of the wood source of the crude tall oil, where such oil is rich in sterol and sterol ester content, when the tall oil pitch is hydrolyzed in accordance with the teachings of the present invention, an appreciable quantity of sterols will be present in the acid denuded tall oil pitch provided over line 62 in each of the FIGS. 1 and 2 systems shown and stored at an appropriate storage location. This acid denuded tall oil pitch can be subsequently processed to recover sterol.

Figure 3:
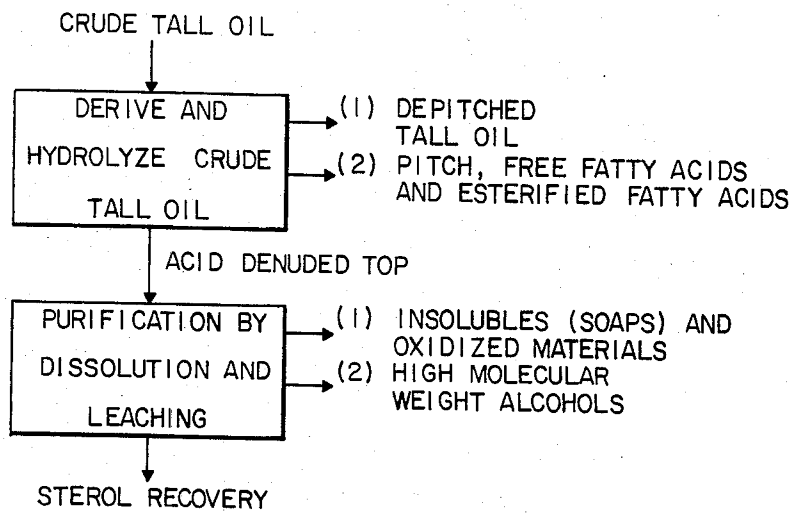
FIG. 3 is a flow chart depicting the individual operations of the process steps of recovering sterols in accordance with one embodiment of the present invention.

More particularly, as shown in FIG. 3, the tall oil pitch is first derived from a fractional distillation process as previously described, and subsequently hydrolyzed so as to enhance the recovery of the fatty acids. This hydrolyzing step will also result in crude sterols being present in the acid denuded tall oil pitch. This remaining pitch can be further processed in accordance with the sterol purification step described as Step D in the Julian patent. As described therein the step is designed to remove metal soaps, oxidation products and high molecular weight alcohols from the sterols. In accordance with one aspect of the present invention a purification step similar to the one described in the Julian patent is carried out to provide sterols. The purification step comprises two stages. In the first stage the wet, acid denuded tall oil pitch (derived from the hydrolysis process of the present invention) is dried. This can be accomplished, for example, by spray or roll drying. Alternatively, the acid denuded tall oil pitch can be used wet, although as suggested in the Julian patent this can lead to operational difficulties and solvent contamination. The solids are then contacted with a solvent, the only requirement of such solvent being that the sterols are soluble therein and that soaps, i.e., the salts of fatty acids, are insoluble therein. Following dissolution of the sterols and high molecular weight alcohols in the solvent, the insolubles are removed physically, e.g., by centrifugation, filtration, skimming, etc. The solvent is then evaporated to yield fairly pure sterols contaminated with some high molecular weight alcohols.

As described in the Julian patent when performing the foregoing stage of purification, it is not necessary that any particular dissolution temperature is used. However, the sterols do tend to dissolve more quickly when the solvent is heated. It is also preferred that the dissolution of the sterol in the solvent be accomplished with the solvent refluxing at atmospheric pressure. The particular solvent used may be selected from a wide variety of polar, aprotic organic solvents having the aforementioned solubilizing characteristics, among which are included the halogenated hydrocarbons, carbonyl compounds, especially ketones, and a variety of other organic materials such as the N, N-dialkyl-amides, for example dimethylformamide. Preferred solvents for dissolving the sterols so as to separate them from the insoluble soaps, are acetone, methyl ethyl ketone and ethylene dichloride.

The second part or stage of the sterol purification technique comprises the removal of any high molecular weight alcohols and other minor contaminants copresent with the sterols by a leaching process wherein these contaminants are selectively dissolved, and the pure, insoluble sterols are retained. In order to provide sterols of the highest purity it is necessary to employ a critical solvent. Advantage is taken of the fact that the high molecular weight alcohols and oxidation product contaminants are mainly polar materials soluble in other polar materials, such as alcohols or nitromethane. However, the sterols are more soluble than alcoholic impurities in the higher alcohols and, thus, the only alcohol apparently suitable for purifying the sterols by this leaching process is methanol. The solubility differences between the contaminating high molecular weight alcohols and the sterols in methanol and nitromethane is accentuated over certain temperature ranges having no apparent upper limit. Hence, methanol or nitromethane can be used at temperatures above about 70° F. to remove the high molecular weight alcohols and other impurities, the pure sterols being insoluble at these temperatures and in these solvents so that they are retained.

During the leaching stage of the sterol purification technique the solid sterols are brought into contact with methanol or nitromethane at a temperature above 70° F., (conveniently 70° F. to 300° F. and preferably 70° F. to 140° F.). Pressure vessels can be employed although the leaching pressure is not critical. The solvents are removed, while they are still hot, along with the dissolved contaminating high molecular weight alcohols. This leaching step can be repeated if necessary. Alternatively, automatic extraction equipment can be used to carry out the leaching process at the temperature detailed to provide continuous removal of the contaminating high molecular weight alcohols from the sterols. Following this step, the pure solid sterols are allowed to dry, and the sterol purification step is complete.

The following is an example, described in the Julian patent and modified to purify sterols provided in the acid denuded pitch derived from the acid recovery process of the present invention. The example is for illustrative purposes and again should not be interpreted as limiting the scope of the present invention.

EXAMPLE 3

The acid denuded tall oil pitch provided from line 62 in either system shown in FIGS. 1 and 2 is first dried in a vacuum oven at about 130° F. The dried solids are then refluxed in methyl ethyl ketone (MEK) for 45 minutes. The mixture is loaded into bottles and centrifuged hot (about 60° C.) for 10 minutes at 600 g. The insolubles are discarded. The liquid phase is stripped of MEK and the residue is dried in a vacuum oven at 130° F.

The dried residue from the MEK solution is refluxed in methanol for 1 hour. The slurry is then filtered at 60° C. and the filter cake washed with cold methanol. The leached solids (filter cake) is dried in a vacuum oven at about 130° F.

Other examples of treating dried solids containing sterols are described in the Julian patent.

Figure 4:
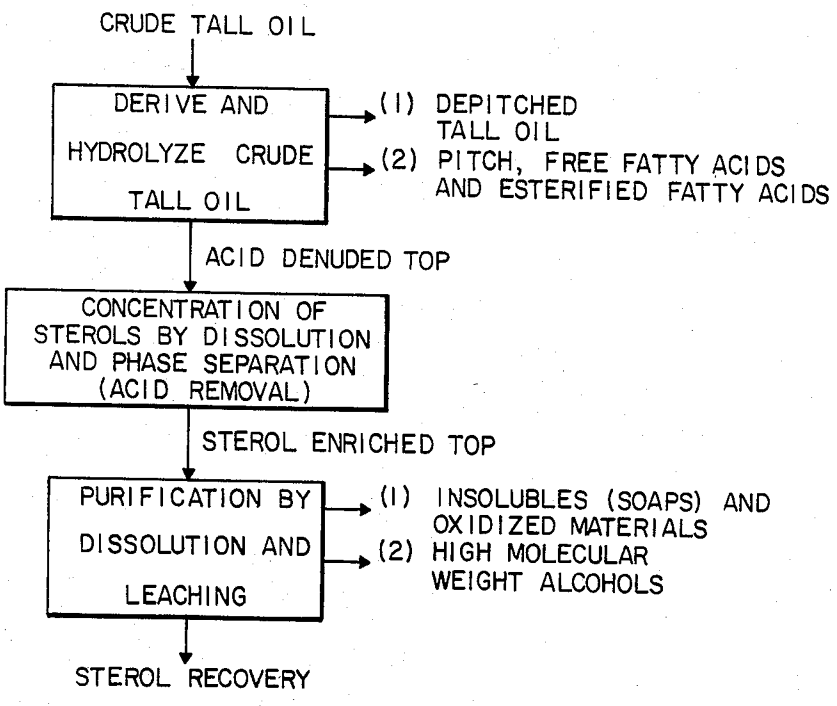
FIG. 4 is a second flow chart depicting the individual operations of alternative process steps of recovering sterols in accordance with another embodiment of the present invention.

If the foregoing solvent extraction method is used to recover sterol from the acid denuded pitch it should be appreciated that some pretreatment might be necessary depending upon the amount of residual acids present in the acid denuded pitch recovered over line 62 in the systems of FIGS. 1 and 2. As shown in FIG. 4 the solvent extraction technique of recoverying sterols from the acid denuded pitch can be preceded by an acid neutralization step (such as described in the Julian patent) so as to reduce caustic consumption in the solvent extraction technique described with respect to FIG. 3. More particularly, utilizing the step (A) described in Julian patent an alcohol-hydrocarbon solvent is selected so that when the acid-denuded pitch is dissolved in the solvent a homogeneous solution is provided. When water is added to this homogeneous solution it separates into two layers, (1) the water alcohol layer containing dissolved acids and (2) the hydrocarbon layer containing dissolved sterols. The removal of residual acids from the acid-denuded pitch is thus achieved by using a properly formulated mixture of organic solvents of the type taught in the Julian patent. Organic solvent mixtures which are liquid at room temperature and atmospheric pressure can be selected so that the need for special pressurized vessels and gas liquifying apparatus is obviated.

The alcohol-hydrocarbon solvent employed is initially immiscible. When the acid denuded tall oil pitch is added to the immiscible mixture the new mixture becomes miscible so as to form a substantially homogeneous system. Water is added in predetermined proportion to this homogeneous mixture so as to separate the mixture into two parts, i.e., a water-alcohol part and a hydrocarbon part. The use of such homogeneous, water-separable solution allows the separation and removal of residual acids from the acid-denuded tall oil pitch without recourse to the countercurrent extraction procedures needed when two-phase solvents are employed in this step. Hence, the residual acid removal step can be carried out in a simple batch operation; or alternatively, standard continuous extraction processes can be employed with these mixed solvents.

The hydrocarbons suitable for use in this process of removing residual acids are described in the Julian patent and include liquid branched-chain, straight-chain and cyclic hydrocarbons containing from about five to about 20 carbon atoms and mixtures thereof, for example, kerosenes, petroleum ethers, light mineral oils and the like. Lower molecular weight hydrocarbons, such as methane, ethane, propane and butane can be employed in this step but must be used in the liquified state, i.e., under pressure, and are therefore not preferred. Exemplary hydrocarbons suitable for use in the mixed solvent of step (A) are pentane, hexane, heptane, octane, nonane, decane, undecane, dodecane, tridecane, tetradecane, pentadecane, hexadecane, heptadecane, octadecane, nonadecane, eicosane, 2-methylpentane, 2-methylhexane, 3-ethylheptane, 3-ethyloctane, 2,3-dimethylnonane, 3,4-diethyl-decane, isooctane, cyclopentane, cyclohexane, cyclodecane and mixtures of these hydrocarbons. Benzene, toluene and the xylenes are also suitably employed as the hydrocarbon component of the hydrocarbon-alcohol solvent used herein in step (A). An especially preferred hydrocarbon component of the mixed organic solvent used in step (A) to remove the acids from the vegetable sterol sources is hexane. Kerosene and petroleum ethers, both "high" and "low" boiling, are also preferred.

Alcohols suitable for use in the residual acid removal step include those alcohols containing from one to about six carbon atoms, more preferably from one to about three carbon atoms. Non-limiting examples of alcohols suitable for such use include methanol, ethanol, propanol, isopropanol, butanol, t-butanol, pentanol, hexanol and isohexanol. Especially preferred alcohols for use in the residual acid removal step of the present process are methyl alcohol and ethyl alcohol.

Preferred mixed alcohol-hydrocarbon solvents used herein in the residual acid removal step include hexane-methanol, kerosene-methanol, petroleum ether-ethanol, petroleum ether-methanol and hexane-ethanol. The ratio of alcohol:hydrocarbon in the mixed solvent can range from about 5:1 to 1:5 and is preferably about 1:1 on a weight basis.

As is noted above, these solvent mixtures are initially heterogeneous and become homogeneous when the acid-denuded tall oil pitch is dissolved therein. Water, in the proper proportions, is then used to cause a phase separation in the homogeneous system comprising the pitch alcohol and hydrocarbon. If too much water is used to effect the phase separation, long-chain acids will be partitioned into the hydrocarbon phase along with the pitch containing sterols and the purification efficiency is decreased. If too little water is used, incomplete phase separation results and some sterols remain with the alcohol-water phase and are lost. The amount of water used to cause a separation of the solution is fairly critical and is within the range from about 0.5 percent by weight of alcohol to about 10 percent by weight of alcohol, more preferably from about 1.5 to about 6 percent, by weight of alcohol present in the mixed hydrocarbon-alcohol solvent.

The ratio of solvent to pitch in this acid removal step is not critical and can be in the range of about 50:1 to about 2:1, more preferably from about 15:1 to about 5:1. Higher solvent-to-pitch ratios could be employed but the percentage of acid extracted does not show a corresponding increase. In a commercial process it is best to avoid large excesses of solvent so as to minimize handling and recovery problems. Lower solvent:pitch ratios result in inconveniently slow dissolution of pitch.

The extraction procedure used to remove any residual free acids from the sterol esters involves dissolving the acid denuded pitch in the organic solvent mixture, whereupon, after addition of water, the solvent separates into an upper, hydrocarbon layer which contains the sterol esters and a lower, alcohol-water phase containing the residual acids. The layers then may be separated mechanically. The hydrocarbon is evaporated to yield nearly acid-free sterol esters and the hydrocarbon can be recovered for reuse. The alcohol-water layer containing residual acid can be evaporated and the acids and alcohols thereby separated and recovered.

The acid removal step can be performed at any convenient temperature, most generally from about 0° C. to about 100° C., more preferably from about 0° C. to about 32° C. Obviously, at the higher temperatures many of the hydrocarbons would be lost by evaporation and when such high temperatures are employed the reaction should be done in a sealed vessel. Operating pressures are not critical in this acid removal step, or in any of the subsequent steps of the present process.

The following example, described in the Julian patent and adapted to the present process, serves to illustrate the present acid removal step and is not intended to be limiting.

EXAMPLE 4

Acid denuded tall oil pitch (30.3 lbs.) derived over line 62 is dissolved in hexane (121 lbs.) with heating and mixing and then mixed with methanol (119 lbs.) with a nitrogen sparge. The ratio of solvent to pitch is 8:1. Water (2.3 lbs.) is then added. The lower level (acid phase) which forms on standing can be drawn off after the mixture has stood overnight at approximately 21° C.

Other examples appear in the Julian patent.

Following the residual acid removal step, the process proceeds to the solvent extraction step previously described with respect to FIG. 3.

In summary the present invention is directed to an improved technique of recovering acid from crude tall oil. The additional steps of solvent extraction, provides a recoverable source of crude sterols in the event that the crude tall oil processed contains an appreciable quantity of sterol esters. If solvent extraction is used as the method of sterol recovery some pretreatment might be necessary, for example, acid neutralization, before the solvent extraction step. The exact procedure will depend upon the solvent used.

Since certain changes may be made in the above process without departing from the scope of the invention herein involved, it is intended that all matter contained in the above description or shown in the accompanying drawings shall be interpreted in an illustrative and not a limiting sense.

What is claimed is:

1. The process of enhancing the recovery of fatty acids from crude tall oil, the process comprising the steps of:

distilling crude tall oil so as to form a first fraction comprising pitch, free fatty acids and fatty acid esters, a second tall oil fraction comprising largely non-volatile material and a third depitched tall oil fraction rich in fatty acids;

separating said first, second and third fractions;

recovering said second and third fractions;

hydrolyzing said first fraction so as to convert at least some of said fatty acid esters to fatty acids;

distilling said hydrolyzed first fraction so as to form additional amounts of said third fraction from said hydrolyzed first fraction; and recovering said additional amounts of said third fraction while reducing the overall amount of said second fraction.

2. The process according to claim 1, further including the step of raising the pressure of said first fraction above atmospheric pressure prior to hydrolyzing said first fraction.

3. The process according to claim 2, wherein hydrolyzing step includes the step of adding hydrolysis water to said first fraction at said raised pressure.

4. The process according to claim 3, wherein the step of adding hydrolysis water includes the step of heating said water prior to adding said water to said pressurized first fraction.

5. The process according to claim 4, wherein the raised pressure of said first fraction is approximately in the range between 40 $Kg/Cm^2$ and 70 $Kg/Cm^2$.

6. The process according to claim 4, wherein said step of distilling said hydrolyzed first fraction includes the step of flash vaporizing said hydrolyzed first fraction so as to form a two-phase vapor-liquid mixture of said hydrolyzed first fraction.

7. The process according to claim 6, wherein said step of distilling said crude tall oil to form said three fractions includes heating said crude tall oil so as to form a two-phase vapor-liquid mixture.

8. The process according to claim 6, wherein said step of distilling said crude tall oil so as to form said three fractions includes the step of feeding said two-phase mixture of said crude tall oil into a fractionating column so that the liquid phase of said crude tall oil functions as reflux feed material, and said step of distilling said hydrolyzed first fraction includes the step of feeding said two-phase vapor-liquid mixture of said hydrolyzed first fraction into said fractionating column so that the vapor phase of said hydrolyzed first fraction functions as a stripping vapor in said column.

9. The process according to claim 8, wherein said step of feeding said two-phase mixture of crude tall oil occurs substantially concurrently with said step of feeding said two phase vapor-liquid mixture of said hydrolyzed first fraction such that the reflux material and stripping vapor flow counter current with respect to one another in said column.

10. The process according to claim 9, wherein said steps of distilling said crude tall oil and distilling said hydrolyzed first fraction include the step of quenching the vapor-phase of each of said two-phase crude tall oil and said hydrolyzed first fraction so as to form said *third fraction.*

11. The process according to claim 9, wherein said steps of distilling said crude tall oil and distilling said hydrolyzed first fraction includes the step of gravitationally drawing said liquid phase of each of said two-phase crude tall oil and said hydrolyzed first fraction so as to form said second fraction.

12. The process according to claim 1, wherein said second fraction includes sterols, and said process further includes the steps of forming a sterol solution by dissolving said second fraction in a first solvent in which sterols and high molecular weight alcohols are soluble; removing said insoluble salts from said sterol solution; evaporating said first solvent from said sterol solution to provide a sterol residue and removing said high molecular weight alcohols from said residue.

13. The process of enhancing the recovery of fatty acids from tall oil pitch containing fatty acid esters, the process comprising the steps of:

hydrolyzing said tall oil pitch so as to convert at least some of said fatty acid esters to fatty acids;

distilling said hydrolyzed tall oil pitch so as to form a first tall oil fraction comprising largely non-volatile materials and a second depitched tall oil fraction rich in fatty acids;

separating said first and second fractions; and recovering said first and second fractions.

14. The process according to claim 13, further including the step of raising the pressure approximately in the range between 40 $Kg/Cm^2$ and 70 $Kg/Cm^2$ and the temperature approximately in the range between 265° C. and 280° C. of said tall oil pitch prior to hydrolyzing said tall oil pitch.

15. The process according to claim 14, wherein said hydrolyzing step includes the step of adding hydrolysis water to said tall oil pitch at said raised pressure.

16. The process according to claim 15, wherein said step of adding hydrolysis water includes the step of heating said water prior to adding said water to said pressurized tall oil pitch.

17. The process according to claim 16, wherein the raised pressure of said tall oil pitch is approximately in the range between 40 $Kg/Cm^2$ and 70 $Kg/Cm^2$ and the temperature is approximately between 265° C. and 280° C.

18. The process according to claim 16, wherein step of treating said hydrolyzed tall oil pitch includes the step of partially vaporizing said tall oil pitch so as to form a two phase vapor-liquid mixture of said hydrolyzed tall oil pitch prior to treating said pitch.

19. The process according to claim 18, wherein said step of treating said two phase vapor-liquid mixture of said hydrolyzed tall oil pitch includes the step of forming a third fraction comprising pitch, free fatty acids and fatty acid esters.

20. The process according to claim 19, further including the step of heating said third fraction so as to form a two-phase vapor liquid mixture of said third fraction.

21. The process according to claim 20, wherein said step of treating said tall oil pitch to form said first and second fractions includes the steps of feeding said two phase mixture of said hydrolyzed tall oil pitch into a fractionating column so that the liquid phase of said pitch functions as reflux feed material and feeding said two phase mixture of said third fraction into said fractionating column so that the vapor phase of said third fraction functions as a stripping vapor in said column.

*22. The process according to claim 21, wherein said* step of feeding said two phase mixture of said hydrolyzed tall oil pitch and said step of feeding said third fraction into said column occur substantially concurrently so that the reflux material and stripping vapor flow counter current with respect to one another in said column.

23. The process according to claim 22, wherein said step of treating said tall oil pitch includes the step of quenching the vapor-phase of each of said two phase mixtures of said hydrolyzed tall oil pitch and said third fraction so as to form said second fraction.

24. The process according to claim 23, wherein said step of treating said tall oil includes the step of gravitationally drawing the liquid phase of each of said hydrolyzed tall oil pitch and said third fraction so as to form said first fraction.

25. The process according to claim 13, wherein said first tall oil fraction includes sterols, and said process further includes the step of treating said first tall oil fraction so as to recover said sterols.

26. An improved process of recovering sterols from crude tall oil, said process comprising the steps of distilling said crude tall oil so as to form a tall oil pitch;

hydrolyzing said tall oil pitch so as to recover free fatty acids from said pitch and form an acid denuded tall oil pitch;

forming a sterol solution by dissolving said acid denuded tall oil pitch in a first solvent in which sterols and high molecular weight alcohols are soluble;

removing said insoluble salts from said sterol solution;

evaporating said first solvent from said sterol solution to provide a sterol residue; and removing said high molecular weight alcohols from said residue.

27. A process according to claim 26, wherein said step of removing said high molecular weight alcohols from said residue includes the step of leaching said residue with a second solvent in which said sterols are insoluble so as to dissolve said high molecular weight alcohols in said second solvent while said sterols remain undissolved; and removing said solvent containing said high weight alcohols.

28. A process according to claim 26, further neutralizing the residual acids provided in said acid denuded tall oil pitch prior to dissolving said acid denuded tall oil pitch in said first solvent.

29. An improved process of recovering fatty acids from crude tall oil, said process comprising the steps of:

distilling said crude tall oil so as to form a tall oil pitch containing fatty acid esters;

hydrolyzing the fatty acid esters present in said tall oil pitch to form free fatty acids; and recovering free fatty acids from the hydrolyzed tall oil pitch.

* * * * *